3,094,570
$C_{10}$–$C_{20}$ α-OLEFIN TREATMENT WITH $H_2SO_4$ FOR REMOVAL OF FREE RADICAL INHIBITORS
Jacob D. Kemp, El Cerrito, Calif., assignor to California Research Corporation, San Francisco, Calif., a corporation of Delaware
No Drawing. Filed May 18, 1960, Ser. No. 29,805
8 Claims. (Cl. 260—677)

This invention relate to treating α-olefins derived from the cracking of petroleum hydrocarbons to render them adaptable for free radical addition reactions. The invention consists in contacting the olefins with sulfuric acid under controlled conditions of time, acid concentration, and dosage sufficient to remove the particular impurities having a deleterious effect on free radical addition reactions while insufficient to cause an appreciable amount of isomerization.

The α-olefins derived from the cracking of petroleum hydrocarbons are excellent intermediates for use in the synthesis of many chemicals and end-use products including detergents, alcohols, polymers, and placticizers. The syntheses by which a number of these products are obtained utilize free radical reactions, such as free radical-initiated copolymerization or free radical addition reactions with sulfenyl halide, hydrogen bromide, a bisulfite, or sodium hydrogen phosphite. In general these reactions are sensitive to the presence of certain impurities in the α-olefin feed which act as free radical inhibitors to either suppress or materially retard the desired free radical reactions. To render these olefins suitable for free radical reactions, they must first be treated to remove these impurities. Acid treating with $H_2SO_4$ has been found to be extremely satisfactory for this purpose.

During the $H_2SO_4$ treatment of α-olefin for removal of impurities, it is desired to retain the olefinic double bond in the alpha position. Any appreciable amount of isomerization yields a treated olefin mixture having the double bonds located throughout the molecule. This mixture of α-, β-, γ-, and other olefins is undesirable for subsequent free radical reactions because of considerable differentials in reaction rates of the various olefin isomers. It is also desired to obtain a unified product so that intermediates obtained by free radical reactions will be reasonably homogeneous in double-bond location, and the end-use products derived from them will be of the same type, i.e., primary, secondary, etc. Intermediates produced from α-olefins include primary polar compounds such as sulfonates, bromides, alcohols, and phosphonates.

$H_2SO_4$ treating processes shown in the prior art are generally used for color improvement of hydrocarbons. The treating processes described, however, utilize relatively large acid dosages, generally about 5 percent by volume of highly concentrated acid (see U.S. Patent No. 1,705,199). In addition, the olefins are usually contacted with the acid for a period of time in excess of 15 minutes, sometimes up to an hour. Due to the amount of isomerization which would result by submitting the α-olefins described herein to the reaction conditions of the prior art for the time period disclosed in the art, these known processes are not suitable for the purposes of the present invention. In was found that an acid concentration of 95 percent used in a 4-percent dosage on α-olefins derived from cracked petroleum hydrocarbons for a contact time of 15 minutes produces excessive isomerization. The α-olefins of this invention, ranging from $C_{10}$–$C_{20}$, have an especially great tendency to isomerize to other olefin structures, such as transinternal olefins. N-dodescene-1 is capable, in the presence of acidic catalyst, of rearrangement to yield a mixture of 11 olefin isomers. The usefulness of such a mixture, as compared with reasonably pure α-olefins, is markedly reduced.

This invention provides a process for treating α-olefins, having from 10 to 20 carbon atoms, derived from the cracking of petroleum hydrocarbons by contacting said olefins with about 0.05 to about 5.0 volume percent of at least 70 percent by weight $H_2SO_4$ for a short period of time, the variables being chosen to minimize isomerization while recovering a product essentially free of inhibitors to a free radical reaction. The $C_{10}$–$C_{20}$ fraction of any olefins derived from the cracking of petroleum hydrocarbons containing varying degrees of impurities may be so treated. Alpha-olefins often requiring this treatment include those derived from the cracking of waxes, distillates, cycle oils, and other hydrocarbons. A preferred feed for the process is the $C_{10}$–$C_{20}$ fraction of normal α-olefins from the cracking of waxy distillates. By treating the olefins under conditions described in this invention, substantially all of the impurities which retard or suppress a free radical addition reaction are removed while isomerization is minimized. After treatment, a free radical reaction may be successfully carried out at a suitable rate on the treated olefins. The product from the free radical addition on a treated α-olefin feed is a mixture of primary polar compounds. Such homogeneous products would be impossible to make using prior art processes because the amount of isomerization in the treating step would be excessive.

The process of the invention may be described as follows. Alpha-olefins derived from the cracking of petroleum hydrocarbons art treated with $H_2SO_4$. The strength and dosage of the $H_2SO_4$ are varied in accordance with the level of impurities in the olefins for optimum impurity removal and minimum isomerization of the α-olefins. For each particular α-olefin mixture, an optimum concentration and dosage of sulfuric acid are used so that a maximum of the impurities are removed while, at the same time, a minimum of isomerization occurs. Dosages should be chosen from the range of about 0.05 to 5.0 volume percent of at least 70 percent by weight $H_2SO_4$, preferably about 0.1 to about 2.0 volume percent of 85 to 98 percent by weight $H_2SO_4$. It is seen, however, that where a more concentrated acid is used, the dosage should be chosen on the lower end of the range.

It is very important in this invention that the contact times be kept to a minimum, preferably less than 5 minutes. Contact times of from 1 to 2 minutes produce excellent results. As the contact time increases over 2 minutes, the amount of isomerization proportionately increases. Experiments have shown that treating an olefin according to this invention for 15 minutes produces upwards of 50 percent isomerization.

The reaction should be carried out at an initial temperature which is at or below room temperature to reduce isomerization, Starting temperatures in the range from about the freezing point of the sulfuric acid employed up to about 80° F. produce excellent results. Excessively high temperatures tend to increase isomerization so that it is undesirable to allow the temperature at any time to rise above 100° F.

After treating the olefin with sulfuric acid, the sludge from the acid contact must be effectively separated from the olefin phase to prevent deterioration of the olefinic product during distillation. Centrifuging and/or filtering the treated olefin serves to improve the separation. In order to minimize further reaction of the olefin with the acid at higher temperature, and to prevent corrosion in the distillation, the olefin phase may be water-washed or caustic-neutralized after the sludge is removed. Once the sludge has been separated, the treated olefin mixture is distilled. The purified olefin mixture, free of inhibitors, is obtained as overhead from a flash distillation. Vacuum distillation is desirable to keep the temperature in the still at a minimum. Condensed impurities remain behind as bottoms.

Alpha-olefins treated according to this invention react at a reasonable rate in free radical addition reactions to yield a uniform α-carbon addition product. They may readily combine satisfactorily with ammonium bisulfite to form a primary sulfonate, and may also be treated with hydrogen bromide to form an alkyl bromide or with sodium hydrogen phosphite to form the primary phosphonate. It is then seen that by means of the simple treating process shown in this invention, α-olefins containing a relatively high level of impurities may be treated to render them readily usable to form relatively homogeneous mixtures of polymers or intermediates for detergents, alcohols, plasticizers, and other primary polar compounds useful to the chemical industry.

*Example*

Alpha-olefins derived from cracked petroleum distillates having from 10 to 20 carbon atoms were treated with 1 volume percent of 96 percent by weight $H_2SO_4$ for 2 minutes. The sludge was removed from the olefin by filtration through a sintered glass filter. After distillation, the product olefin showed only 5 percent isomerization to transinternal olefins. The olefin treated in this manner was contacted with $NH_4HSO_3$ and a suitable initiator at pH range 7–8 at 120° F. A satisfactory ammonium alkyl sulfonate was obtained for use as an intermediate in detergent manufacture. The reaction proceeded at an average rate of 24 percent olefin reacting per hour. The same reaction using untreated olefin proceeded at an average rate of only 13 percent olefin reacting per hour.

Alpha-olefins were treated with 0.5 volume percent of 96 percent by weight $H_2SO_4$ and 0.25 volume percent of 96 percent by weight $H_2SO_4$, respectively, for 2 minutes. While the impurities were substantially removed, isomerization with the larger dosage was more than twice the amount encountered with the smaller. One volume percent of 90 percent by weight $H_2SO_4$ showed minimal isomerization and substantially complete impurity removal.

As will be evident to those skilled in the art, various modifications can be made or followed, in the light of the foregoing disclosure and discussion, without departure from the spirit or scope of the disclosure or from the scope of the claims.

I claim:

1. A process for treating α-olefins derived from cracking of petroleum hydrocarbons and having from 10 to 20 carbon atoms and inhibitors to free radical reactions to render them adaptable for a free radical reaction which comprises: contacting said olefins with about 0.05 to about 5.0 volume percent of at least 70 percent by weight $H_2SO_4$ for a period of time of less than about five minutes, separating the olefin phase from the acid sludge, and distilling said olefin phase to obtain an essentially inhibitor-free overhead, said percentages and said time being selected to minimize isomerization while recovering an overhead olefin product essentially free of said inhibitors to said free radical reaction.

2. A process for treating α-olefins derived from cracking of petroleum hydrocarbons and having from 10 to 20 carbon atoms and inhibitors to free radical reactions to render them adaptable for a free radical reaction which comprises: contacting said olefin at an initial temperature from about 30° F. to about 80° F. with about 0.1 to about 2.0 volume percent of 85 to 98 percent by weight $H_2SO_4$ for a period of time of less than about five minutes, separating the olefin phase from the acid sludge, and distilling said olefin phase to obtain an essentially inhibitor-free overhead, said percentages and said time being selected to minimize isomerization while recovering an overhead olefin product essentially free of said inhibitors to said free radical reaction.

3. A process for treating α-alefins derived from cracking of petroleum hydrocarbons and having from 10 to 20 carbon atoms and inhibitors to free radical reactions to render them adaptable for a free radical reaction which comprises: contacting said olefins with about 0.05 to about 5.0 volume percent of at least 70 percent by weight $H_2SO_4$ for a period of time of less than about five minutes, separating the olefin phase from the acid sludge, water washing said olefin phase, and distilling said olefin phase to obtain an essentially inhibitor-free overhead, said percentages and said time being selected to minimize isomerization while recovering an overhead olefin product essentially free of said inhibitors to said free radical reaction.

4. A process for treating α-olefins derived from cracking of petroleum hydrocarbons and having from 10 to 20 carbon atoms and inhibitors to free radical reactions to render them adaptable for a free radical reaction which comprises: contacting said olefin at an initial temperature from about 30° F. to about 80° F. with about 0.1 to about 2.0 volume percent of 85 to 98 percent by weight $H_2SO_4$ for a period of time of less than about five minutes, separating the olefin phase from the acid sludge, water washing said olefin phase, and distilling said olefin phase to obtain an essentially inhibitor-free overhead, said percentages and said time being selected to minimize isomerization while recovering an overhead olefin product essentially free of said inhibitors to said free radical reaction.

5. A process for treating α-olefins derived from cracking of petroleum hydrocarbons and having from 10 to 20 carbon atoms and inhibitors to free radical reactions to render them adaptable for a free radical reaction which comprises: contacting said olefins with about 0.05 to about 5.0 volume percent of at least 70 percent by weight $H_2SO_4$ for a period of time of less than about five minutes, separating the olefin phase from the acid sludge, caustic-neutralizing said olefin phase, and distilling said olefin phase to obtain an essentially inhibitor-free overhead, said percentages and said time being selected to minimize isomerization while recovering an overhead olefin product essentially free of said inhibitors to said free radical reaction.

6. A process for treating α-olefins derived from cracking of petroleum hydrocarbons and having from 10 to 20 carbon atoms and inhibitors to free radical reactions to render them adaptable for a free radical reaction which comprises: contacting said olefin at an initial temperature from about 30° F. to about 80° F. with about 0.1 to about 2.0 volume percent of 85 to 98 percent by weight $H_2SO_4$ for a period of time of less than about five minutes, separating the olefin phase from the acid sludge, caustic-neutralizing said olefin phase, and distilling said olefin phase to obtain an essentially inhibitor-free overhead, said percentages and said time being selected to minimize isomerization while recovering an overhead olefin product essentially free of said inhibitors to said free radical reaction.

7. A process for treating α-olefins derived from cracking of petroleum hydrocarbons and having from 10 to 20 carbon atoms and inhibitors to free radical reactions to render them adaptable for a free radical reaction which comprises: contacting said olefins with about 0.05 to about 5.0 volume percent of at least 70 percent by weight $H_2SO_4$ for a period of time of less than about five minutes, separating the olefin phase from the acid sludge, and vacuum distilling said olefin phase at low temperature to obtain an essentially inhibitor-free overhead, said percentages and said time being selected to minimize isomerization while recovering and overhead olefin product essentially free of said inhibitors to said free radical reaction.

8. A process for treating α-olefins derived from cracking of petroleum hydrocarbons and having from 10 to 20 carbon atoms and inhibitors to free radical reactions to render them adaptable for a free radical reaction which comprises: contacting said olefin at an initial temperature from about 30° F. to about 80° F. with about 0.1 to about 2.0 volume percent of 85 to 98 percent by weight $H_2SO_4$ for a period of time of less than about five minutes, separating the olefin phase from the acid sludge, and vacuum distilling said olefin phase at low temperature to obtain an essentially inhibitor-free overhead, said percentages and said time being selected to minimize isomerization while recovering an overhead olefin product essentially free of said inhibitors to said free radical reaction.

References Cited in the file of this patent

UNITED STATES PATENTS

| | | |
|---|---|---|
| 2,463,873 | Heinrich | Mar. 8, 1949 |
| 2,729,594 | Alderson et al. | Jan. 3, 1956 |
| 2,882,225 | Johnston | Apr. 14, 1959 |
| 2,958,715 | Sanford et al. | Nov. 1, 1960 |
| 2,968,682 | Crouse et al. | Jan. 17, 1961 |